(12) United States Patent
Biswas

(10) Patent No.: US 9,008,608 B2
(45) Date of Patent: Apr. 14, 2015

(54) SYSTEM FOR USING A PRESENCE STATUS INDICATION TO INFORM A COLLABORATION ENVIRONMENT OF AN EMERGENCY

(71) Applicant: Cisco Technology, Inc., San Jose, CA (US)

(72) Inventor: Debanjan Biswas, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 234 days.

(21) Appl. No.: 13/894,568

(22) Filed: May 15, 2013

(65) Prior Publication Data

US 2014/0342685 A1    Nov. 20, 2014

(51) Int. Cl.
| | | |
|---|---|---|
| *H04M 3/42* | (2006.01) | |
| *H04W 4/22* | (2009.01) | |
| *H04L 29/08* | (2006.01) | |
| *H04L 12/58* | (2006.01) | |
| *H04W 4/08* | (2009.01) | |

(52) U.S. Cl.
CPC ............ *H04W 4/22* (2013.01); *H04M 3/42365* (2013.01); *H04L 67/24* (2013.01); *H04L 51/00* (2013.01); *H04W 4/08* (2013.01)

(58) Field of Classification Search
CPC . H04M 11/00; H04M 1/2473; H04M 1/2478; H04M 1/575; G09G 5/005; H04N 7/142; H04N 7/15; H04Q 2213/1324
See application file for complete search history.

(56) References Cited

U.S. PATENT DOCUMENTS

2006/0148499 A1* 7/2006 Chie .............................. 455/515
2009/0047934 A1* 2/2009 Wassingbo ................. 455/412.2

OTHER PUBLICATIONS

SIPXES Instant Messaging, by Josh Patten, latest edition dated Feb. 2011.*
http://www.teotech.com/solutions/UC%20Solutions/2; screenshot from May 15, 2013.
"Change Your Presence Status"; http://office.microsoft.com/en-in/communicator-help/change-your-presence-status-HA102146941.aspx; screenshot from May 15, 2013.
B. Rosen et al.; "Data-Only Emergency Calls"; Internet-Draft draft-ietf-ecrit-data-only-ea-04.txt; Nov. 9, 2012; pp. 1-23; Internet Engineering Task Force (IETF).
B. Rosen et al.; "Framework for Emergency Calling Using Internet Multimedia"; ISSN 2070-1721; Dec. 2011; pp. 1-38; Internet Engineering Task Force (IETF).

* cited by examiner

*Primary Examiner* — Quan M Hua
(74) *Attorney, Agent, or Firm* — P. Su

(57) ABSTRACT

In one embodiment, a method includes determining when a first party has initiated contact with a second party, wherein the first party initiates contact with the second party on a communications link. The method also includes identifying identification information of the second party, and updating a presence status indication of the first party to indicate that the first party has initiated contact with the second party. The presence status indication includes information associated with the second party. The presence status indication is provided to a first application arranged to monitor the presence status of the first party. Finally, the method includes presenting the presence status indication of the first party with respect to the first application.

20 Claims, 6 Drawing Sheets

SYSTEM FOR USING A PRESENCE STATUS INDICATION TO INFORM A COLLABORATION ENVIRONMENT OF AN EMERGENCY

TECHNICAL FIELD

The disclosure relates generally to collaboration systems. More particularly, the disclosure relates to identifying when a user of a collaboration system is initiating contact with a provider of emergency services, and updating the presence status of the user to indicate that the user is in an emergency situation.

BACKGROUND

When a person is in need to emergency services, e.g., police services or ambulance services, he or she may dial an emergency number such as 911 from a telephone. In response to a call for emergency services, an emergency response team may locate the person and provide requested services. Emergency response teams dispatched to the scene of an emergency are generally successful in providing requested services in a relatively timely manner. In some situations, however, the ability to provide a person in need of emergency services in a timelier manner may be needed.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
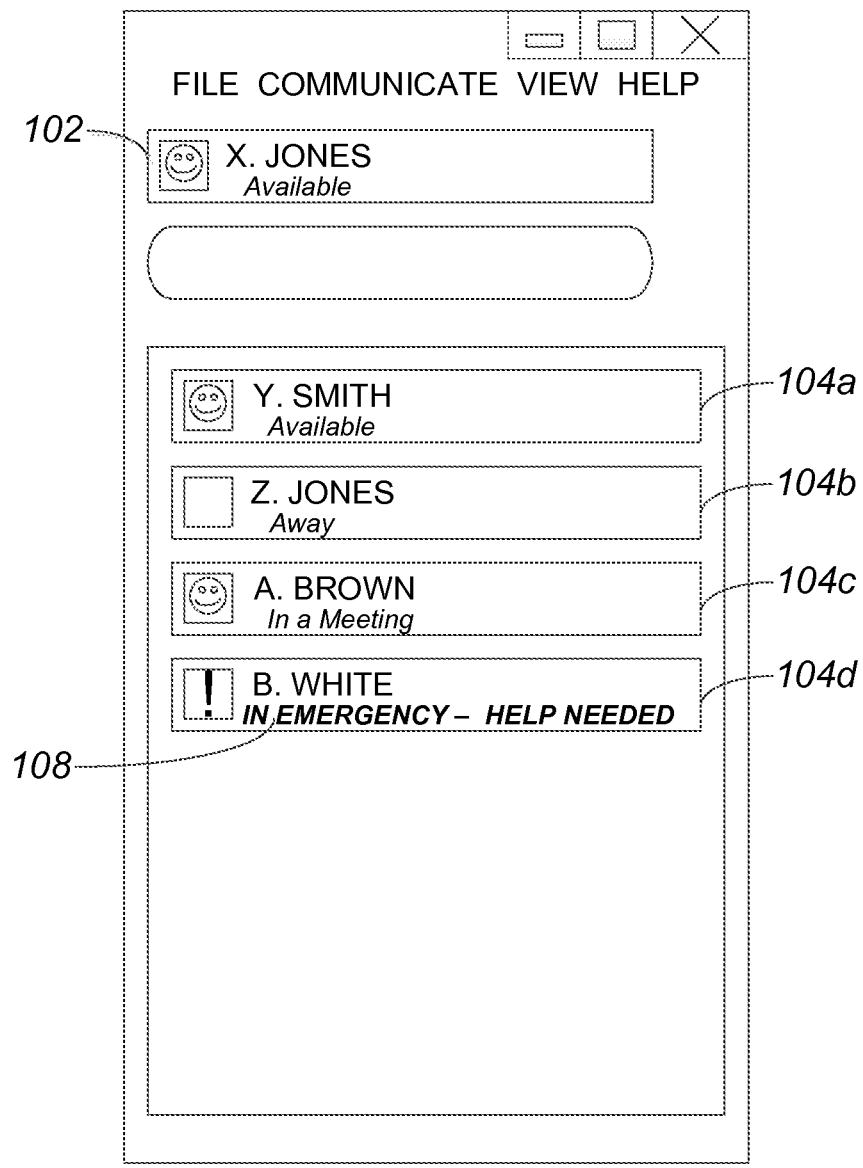
FIG. 1 is a diagrammatic representation of a presence application, e.g., a messaging interface of a presence application, in which a presence status of a party indicates an emergency in accordance with an embodiment.

According to one aspect, a method includes determining when a first party has initiated contact with a second party, wherein the first party initiates contact with the second party on a communications link. The method also includes identifying identification information of the second party, and updating a presence status indication of the first party to indicate that the first party has initiated contact with the second party. The presence status indication includes information associated with the second party. The presence status indication is provided to a first application arranged to monitor, or to obtain, the presence status of the first party. Finally, the method includes presenting the presence status indication of the first party with respect to the first application.

Description

When a call is made for emergency services, an emergency response team may be dispatched to the scene of an emergency. For example, when a call is made to 911 in the United States, a "911 dispatcher" may obtain information from a caller, and dispatch an appropriate emergency service provider to a location identified during the call.

In some situations, it may be highly desirable to provide immediate help to a person in need of assistance before an emergency response team arrives to provide assistance. By way of example, if an individual in the same building as a person in need of assistance is made aware of the need for help, the individual may be able to provide assistance before an emergency response team arrives, and may increase the likelihood of a desirable outcome.

Many collaboration systems include presence applications, e.g., instant messaging applications, which identify a presence status of users of, or parties on, the collaboration system. Typically, the presence status of a party identifies a current status of the party, and may be displayed with respect to an instance of a presence application of another party. A presence status of a party may indicate, for example, that party is in a meeting, on a call, away, or available.

By allowing a presence status of a particular party to be substantially automatically updated to indicate when the particular party is seeking emergency assistance, other parties to whom the presence status of the particular party is available may become aware that the particular party is in need of emergency assistance and may be able to provide immediate assistance. For instance, if a party notices that a particular party in need of emergency assistance is in the same building, he or she may be able to quickly reach the particular party and begin rendering emergency assistance, e.g., before an emergency response team arrives.

In one embodiment, a collaboration system may monitor voice over Internet Protocol (VoIP) phones to determine when a call is placed to an emergency telephone number. As such, a call that is placed to an emergency number may be placed by a party that is connected over a network, e.g., an Internet network, to a call manager and a presence server. When the collaboration system identifies a call by a party to an emergency telephone number, the collaboration system may substantially automatically update the presence status of the party to indicate an emergency situation, and cause the updated presence status of the party to be displayed or otherwise presented within the collaboration system, e.g., displayed with respect to instances of presence and/or instant messaging applications on computer systems of parties in the collaboration system. It should be appreciated that a collaboration system may generally monitor any type of device or application to determine when a call is placed to an emergency number, and that a collaboration system is not limited to monitoring VoIP phones.

Upon initiation of a call by a party to an emergency dispatcher, e.g., an operator reached by dialing 911, or an emergency services provider, a presence status of the party within an overall collaboration environment may be substantially automatically updated to indicate that the party is in an emergency situation. An indication of the presence status of the party and, hence, the need for emergency assistance, may be automatically provided to substantially all parties in the collaboration environment that have the party identified as a contact or a "buddy," or that are monitoring the status of the party.

A presence status of the party within an overall collaboration environment may be substantially automatically updated to indicate that the party is in an emergency situation, in some instances, regardless of whether an initiated call to an emergency dispatcher or an emergency services provider is successful or unsuccessful. In other words, even if a call requesting emergency services is not successfully completed, a presence status indication may still indicate that a party that attempted to place the call is in an emergency situation.

Referring initially to FIG. 1, a presence application, e.g., a messaging interface of an instant messaging and/or presence application, in which a presence status of a party indicates an emergency will be described in accordance with an embodiment. A messaging interface 100 that is an instance of a presence application displays information that identifies contacts 104a-d associated with a party 102. That is, messaging interface 100 may be displayed on a screen, e.g., a screen of a computing device or a smart phone, of party 102, and provides party 102 with presence statuses of contacts 104a-d. Contacts 104a-d may be listed in a "buddy list" associated with party 102. In general, party 102 and contacts 104a-d may all be associated with a collaboration environment, e.g., an environment in which an instant messaging and/or presence application collaborates with IP phones such as VOIP phones. It should be understood that party 102 and contacts 104a-d may be such that party 102 and at least one of contacts 104a-d are in different domains, but are able to view presence statuses across the different domains.

As shown, a presence status indicator 108 that identifies a presence status of contact 104d indicates that contact 104d is in an emergency. In the described embodiment, when contact 104d dials an emergency number using a phone, e.g., a VoIP phone, a collaboration server that is part of the collaboration environment may determine that contact 104d has dialed the emergency number, and may automatically update presence status indicator 108 of contact 104d to indicate that contact 104d is in an emergency and needs help, and provide the updated presence status indicator 108 to messaging interface 100.

Presence status indicator 108 may effectively be highlighted such that the need for emergency help may be readily identified. Any suitable method may be used to highlight the need for emergency help. For example, presence status indicator 108 may be of a particular color, may be in capital letters, may be of a different size, and/or may include a particular icon. In general, presence status indicator 108 may be presented in such a way as to be differentiated from presence status indicators which do not indicate an emergency. A pop-up window that indicates an emergency may be presented to effectively highlight presence status indicator 108. It should be appreciated that presence status indicator 108 is not limited to being visually highlighted. Presence status indicator 108 may also be accompanied by an audio aspect, e.g., an audio alert or alarm may sound when presence status indicator 108 is updated to reflect a need for emergency assistance. In one embodiment, when presence status indicator 108 is displayed on a device that is capable of vibrating, e.g., a smart phone, the device may vibrate to effectively highlight a need for emergency assistance.

Figure 2:
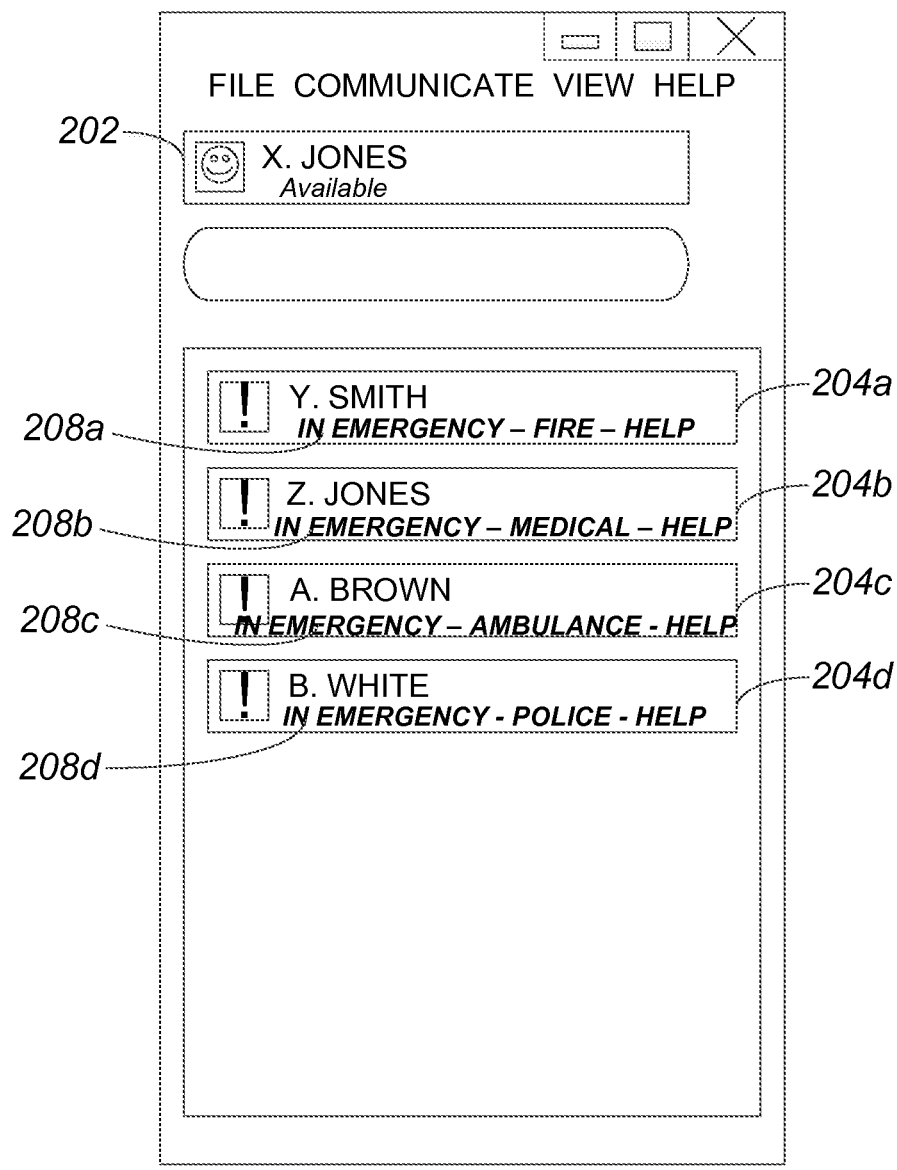
FIG. 2 is a diagrammatic representation of a presence application, e.g., a messaging interface of a presence application, in which presence statuses of parties indicate types of emergencies in accordance with an embodiment.

Presence status indicator 108 generally indicates that contact 104d is in an emergency situation, and requires assistance. In some instances, a presence status indicator which indicates an emergency situation may indicate a type of assistance that is needed. By way of example, when there are different emergency numbers for different emergency services, a type of assistance that is needed may be identified based on the emergency number that is dialed. For instance, where there are different emergency numbers for police, fire, and ambulance, a collaboration server may identify which number was dialed by a party and update a presence status indicator associated with the party accordingly. FIG. 2 is a diagrammatic representation of a presence application, e.g., a messaging interface of a presence application, in which presence statuses of parties indicate types of emergencies in accordance with an embodiment. A messaging interface 200 that is an instance of a presence application displays information that identifies contacts 204a-d associated with a party 202. Party 202 and contacts 204a-d may all be associated with a collaboration environment, e.g., an environment in which an instant messaging and/or presence application collaborates with IP phones such as VOIP phones. It should be appreciated that while IP phones such as VOIP phones are discussed, any telephony device may generally be associated with a collaboration environment. In addition to IP phones, suitable telephony devices may include, but are not limited to including, a soft phone running on a computer system, a soft phone running on a thin client, a soft phone running on a portable device such as a tablet, and/or a smart phone. In addition, a collaboration environment may include a federated presence, in which a presence status of a party in one domain may be viewed by a party in another domain.

Contact 204a has a presence status indicator 208a which indicates that contact 204a is in an emergency, and in need of assistance from a fire department. When contact 204a calls an emergency number associated with a fire department, presence status indicator 208a may be substantially automatically updated, e.g., by a collaboration server that identifies the emergency number called by contact 204a. As shown, contact 204b has a presence status indicator 208b which indicates an emergency and a need for medical assistance, contact 204c has a presence status indicator 208c which indicates an emergency and a need for an ambulance, and contact 204d has a presence status indicator 208d which indicates an emergency and a need for police assistance.

Figure 3:
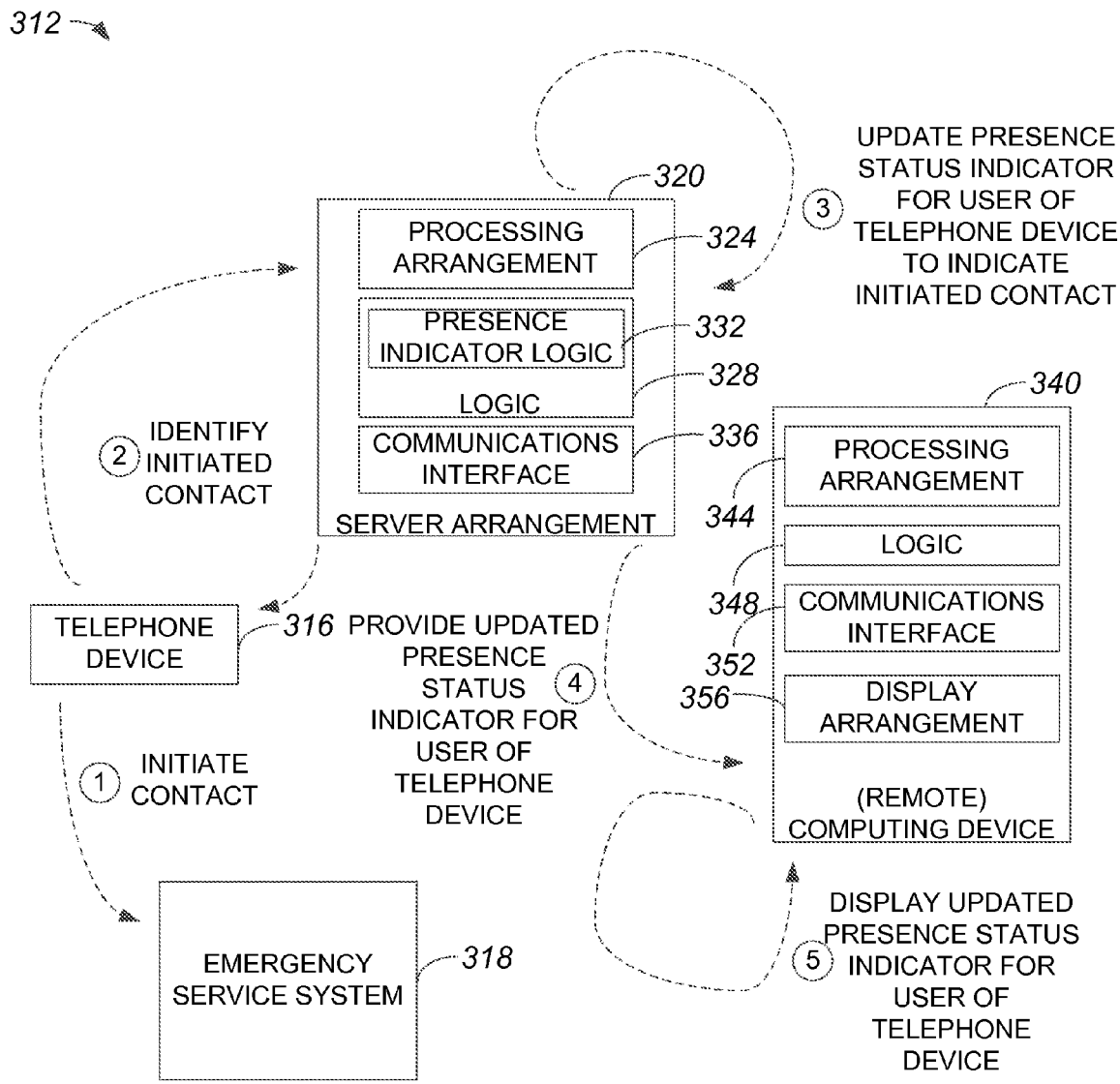
FIG. 3 is a block diagram representation of a collaboration system in which a presence status indication of a party may indicate an emergency in accordance with an embodiment.

FIG. 3 is a block diagram representation of an overall collaboration system in which a presence status indication of a party may indicate an emergency in accordance with an embodiment. A collaboration system 312 generally includes any number of telephone devices, e.g., a telephone phone device 316, and any number of computing devices, e.g., computing device 340. Collaboration system 312 also includes a least one server arrangement 320 that is generally configured to identify phone numbers dialed by phone device 316 and to update a presence status associated with a user of phone device 316 based on the dialed phone numbers.

Telephone device 316 may generally be any suitable telephony device including, but not limited to including, an IP phone such as a VoIP phone. Telephone device 316 is generally a first endpoint used to initiate a call to, or to establish a communications link or connection to, a second endpoint. In one embodiment, the second endpoint may be associated with an emergency dispatcher or a provider of emergency services 318. Emergency service system 318 may effectively have an "identity" which indicates an emergency situation. In other words, when telephone device 316 initiates communications with emergency service system 318, a user of telephone device 316 may be assumed as being in need of emergency assistance.

Server arrangement 320 has a communications interface 336 which allows server arrangement 320 to monitor communications associated with telephone device 316, and also includes at least one input/output (I/O) communications port (not shown). For example, communications interface 336 may monitor communications to identify a phone number dialed by telephone device 316 or received by telephone device 316. Communications interface 336 also communicates with computing device 340 to provide, for example, a presence status associated with a user of telephone device 316 to computing device 340. Server arrangement 320 also includes a processing arrangement 324 that includes at least one processor, and logic 328. Processing arrangement 324 is arranged to execute logic 328. Logic 328 is generally configured to support collaboration, and may be configured to support presence applications and the monitoring of telephone device 316. Logic 328 includes presence indicator logic 332 that is configured to automatically update a presence status indicator associated with a user of telephone device 316 based on a phone number dialed using telephone device 316. That is, presence indicator logic 332 is configured to automatically update a presence status indicator for a user of telephone device 316 to indicate that the user is in an emergency situation when it is detected that telephone device 316 has been used to initiate a call requesting emergency services.

Computing device 340 includes a processing arrangement 344, logic 348, a communications interface 352 that includes at least one I/O communications port (not shown), and a display arrangement 356. Logic 348 is generally configured to allow computing device 340 to participate within collaboration environment 312, and supports the display of an instance of a messaging and/or presence application on display arrangement 356. In the described embodiment, a presence status indicator which indicates a presence status of a user of telephone device 316 is displayed in the instance of a messaging and/or presence application presented on display arrangement 356. Through communications interface 352, computing device 340 may substantially automatically obtain an updated presence status indicator associated with a user of telephone device 316 from server arrangement 320.

When a user of telephone device 316 initiates contact with an emergency service system 320, server arrangement 320 determines that contact with emergency service system 320 has been initiated. In one embodiment, server arrangement 320 monitors communications associated with telephone device 316, and identifies a phone number dialed using telephone device 316. After identifying the phone number dialed using telephone device 316, server arrangement 320 determines that the phone number is associated with emergency service system 318, and ascertains that the user of telephone device 316 is in need of emergency assistance. As such, server arrangement 320 substantially automatically updates a presence status indicator for the user of telephone device 316 to indicate that the user is in an emergency situation. Server arrangement 320 then automatically provides the updated presence status indicator to computing device 340, which displays an instance of a messaging or presence application, e.g., on display arrangement 356, in which the user of telephone device 316 is identified as a contact or as a buddy. It should be appreciated that server arrangement 320 generally provides the updated presence status indicator to substantially all computing devices associated with parties that have the user of telephone device 316 identified as a contact or as a buddy, or parties that are otherwise monitoring the presence status of the user of telephone device 316, within collaboration system 312.

Figure 4:
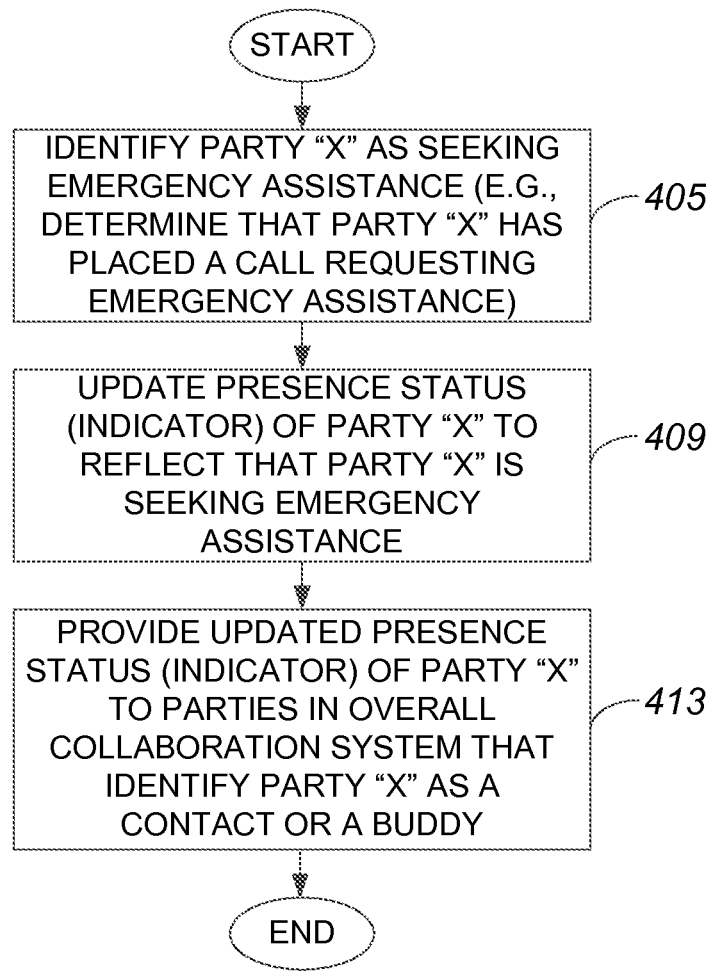
FIG. 4 is a process flow diagram which illustrates a method of identifying an emergency status using a presence status indication of a party in a collaboration system in accordance with an embodiment.

With reference to FIG. 4, a method of identifying an emergency status using a presence status indication of a party in a collaboration system will be described in accordance with an embodiment. A method 401 of identifying an emergency status of a party begins at step 405 in which party "X" is identified, e.g., by a collaboration server such as server arrangement 320 of FIG. 3 that is associated with an overall collaboration system, as seeking emergency assistance. For example, a collaboration server may determine that party "X" has initiated or otherwise placed a call to an emergency number such as 911 to request emergency assistance.

After party "X" is identified as seeking emergency assistance, a presence status of party "X" is substantially automatically updated in step 409. In one embodiment, a presence status indicator for party "X" is substantially automatically updated to indicate that party "X" is in an emergency situation. That is, as party "X" has called a telephone number associated with an emergency dispatcher or a provider of emergency services, a presence status indicator for party "X" is updated to reflect an emergency situation. Once the presence status for party "X" is updated, process flow proceeds to step 413 in which the updated presence status of party "X" is automatically provided to parties, or computing systems used by the parties, in the collaboration system that identify party "X" as a contact or a buddy. It should be appreciated that the updated presence status of party "X" may be presented to the parties in instances of a messaging and/or presence application. Upon providing an updated presence status of party "X" to parties in the overall collaboration system, the method of identifying an emergency status of a party is completed.

In one embodiment, an actual telephone number called by a party or other identifying information associated with a telephone number called by the party may be reflected in a presence status indication associated with the party. The actual telephone number called by a party may generally be any telephone number, and is not limited to being an emergency telephone number. By way of example, if a party dials a telephone number belonging to an individual, the telephone number may be identified in the presence status indication associated with the party and/or the name of the individual may be identified in the presence status indication associated with the party. For instance, if a party dials a telephone number "408-555-5555" that belongs to "Mr. Z," a presence status indicator for the party may read "On a Call with 408-555-5555," "On a Call with Mr. Z," or "On a Call with Mr. Z 408-555-5555".

Figure 5:
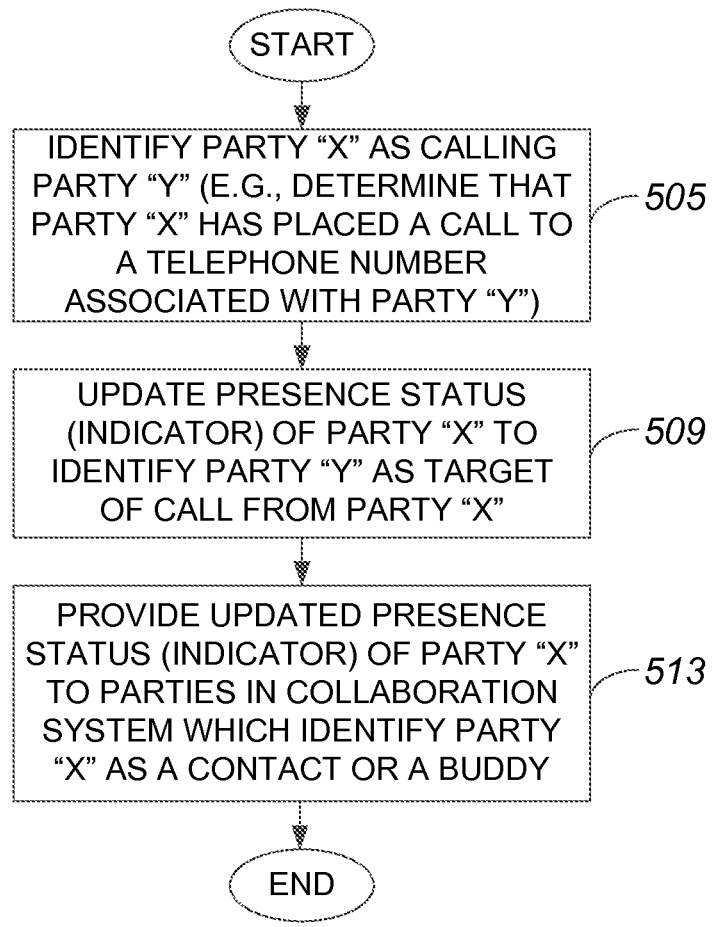
FIG. 5 is a process flow diagram which illustrates a method for identifying a called, or otherwise contacted, party using a presence status indication of a party in accordance with an embodiment.

Referring next to FIG. 5, a method for identifying a called, or otherwise contacted, party in a presence status indication associated with a calling party will be described in accordance with an embodiment. A method 501 of identifying a called party or a callee in a presence status indicator begins at step 505 in which party "X" is identified, e.g., by a collaboration server such as server arrangement 320 of FIG. 3 that is associated with an overall collaboration network, as initiating a call to party "Y". For example, a collaboration server may determine that party "X" has placed a call to a telephone number that is associated with party "Y".

After party "X" is identified as placing a call to party "Y", a presence status of party "X" is substantially automatically updated in step 509. A presence status indicator for party "X" may be substantially automatically updated by the collaboration server to identify party "Y" as a target of a call from party "X". That is, the presence status indicator for party "X" may be updated to indicate that party "X" is on a call with party "Y". It should be appreciated that any suitable information that effectively identifies party "Y" may be included in the presence status indicator for party "X". Suitable information may include, but is not limited to including, the telephone number called by party "X", the name of party "Y", a userid of party "Y" that is known within the collaboration system, and/or an email address used by party "Y".

Once the presence status for party "X" is updated in step 509, process flow moves to step 513 in which the updated presence status of party "X" is automatically provided to parties, or computing systems used by the parties, in the collaboration system that identify party "X" as a contact or a buddy, or are otherwise monitoring the presence status of party "X". It should be appreciated that the updated presence status of party "X" may be presented to the parties in instances of a messaging and/or presence application. Upon providing an updated presence status of party "X" to parties in the overall collaboration system, the method of identifying a called party in a presence status indicator is completed.

Figure 6:
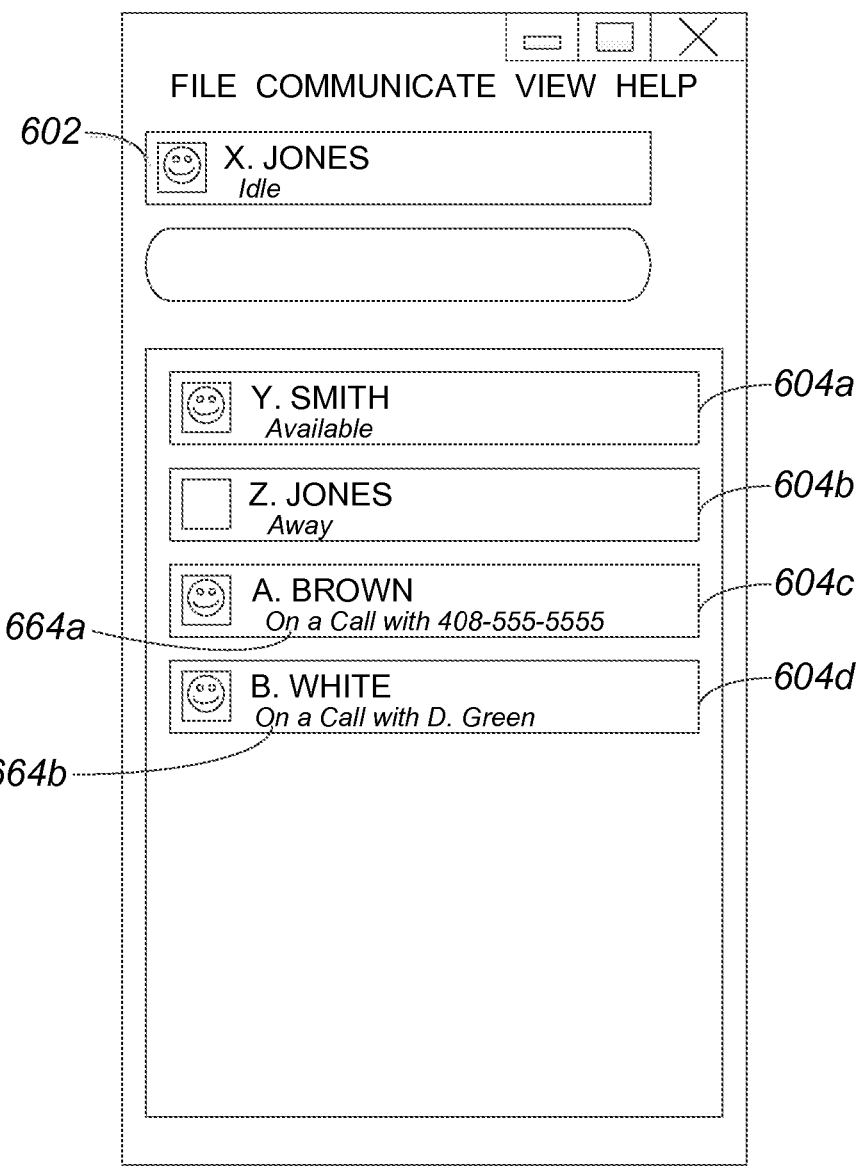
FIG. 6 is a diagrammatic representation of a presence application, e.g., a messaging interface of a presence application, in which presence statuses of parties indicate who parties have called in accordance with an embodiment.

FIG. 6 is diagrammatic representation of a presence application, e.g., a messaging interface of a presence application, in which presence statuses of parties indicate who parties have called in accordance with an embodiment. A messaging interface 600 that is an instance of a messaging and/or presence application displays information that identifies contacts or buddies 604a-d associated with a party 602. A presence status indicator 664a that identifies a presence status of contact 604c indicates that contact 604c is on a call with a telephone number "408-555-5555." A presence status indicator 664b that identifies a presence status of contact 604d indicates that contact 604d is on a call with "D. Green."

Although only a few embodiments have been described in this disclosure, it should be understood that the disclosure may be embodied in many other specific forms without departing from the spirit or the scope of the present disclosure. By way of example, the amount of time a presence status of a party indicates an emergency situation may vary widely. As a party may end a call to an emergency services provider while emergency assistance is still needed, e.g., a party may accidently hang up on a call to 911 or a party may purposely hang up on a call to 911 once he or she is assured that an emergency response team has been dispatched, a presence status of the party may continue to indicate that the party is in an emergency situation even after the call has ended. In one embodiment, a presence status may indicate an emergency situation for a party for a predetermined amount of time after a call to obtain emergency services has concluded. In another embodiment, a presence status may indicate an emergency situation for a party until the party takes some action to effectively reset the presence status, e.g., the party may be presented with an input field on his or her computing device in which to answer a password.

As described above, a presence status indication may generally provide information relating to a party on a call. For instance, as discussed above, a presence status indication associated with a party that has originated a call may identify a target of the call. In lieu of effectively identifying a specific endpoint of a call in a presence status indication, general information relating to the specific endpoint may be identified in a presence status indication. By way of example, if a call is placed to a telephone number known to be a part of an enterprise located in San Francisco, a presence status indication may indicate "On a Call to San Francisco office of Enterprise." Alternatively, if a call is placed to an international telephone number, a presence status indication may indicate "On an International Call." It should be understood that the presence status of parties at each endpoint of a call may be updated, In an embodiment in which a presence status indication provides information relating to a party on a call, the party may be provided with an option to disable the ability to provide information relating to him or her in the presence status indication, For example, in party "A" elects to prevent his or her identifying information from being provided in a presence status indication, in lieu of a presence status indication that indicates "On a Call with party 'A'," for a call involving party "A", a presence status indication may instead indicate "On a Call."

In general, a presence status indication may indicate a category to which a called, or otherwise contacted, telephone number belongs. For example, a telephone number that is called may be identified as an international telephone number assigned to a particular country or a telephone number that is called may be identified as a local telephone number. The type of call or contact may also be identified in a presence status indication, e.g., an on-net call or a Web meeting may be identified in a presence status indication, without departing from the spirit or the scope of the disclosure.

When a presence status indication indicates an emergency, a location of the emergency may also be provided in the presence status indication. For example, if a call seeking emergency assistance is known to originate from telephony device at a particular location, a presence status indication may identify the location. Providing a location in addition to an emergency indication in a presence status may further expedite the administration of emergency assistance.

A presence status of a party has been described as being updated to identify an emergency when the party calls, or otherwise initiates a connection to, an emergency services dispatcher or provider. It should be appreciated, however, that an emergency is not limited to being identified when a party calls, or otherwise initiates a connection to, an emergency services dispatcher or provider. By way of example, a presence status of a party may be updated to identify an emergency when the party sends an email, a text message, or an instant message to an emergency services dispatcher or provider without departing from the spirit or the scope of the disclosure.

In general, any suitable instant messaging and/or presence applications may present a presence status indication which indicates when a party is in an emergency situation. Suitable instant messaging and/or presence applications include, but are not limited to including, WebEx Connect and Cisco Jabber which are available commercially from Cisco Systems, Inc. of San Jose, Calif. A presence status indication which indicates when a party is in an emergency situation may be implemented with respect to any suitable application which utilizes presence status indications.

In addition to automatically updating a presence status indication of a first party that is in an emergency situation in an instance of a messaging and/or presence application displayed on a screen of a second party, other methods may also be used to notify the second party that the first party is in an emergency situation. For example, a message may pop up on a screen of the second party which indicates that the first party is in need of emergency assistance, an audio message may indicate details of the emergency assistance needed by the first party, and/or an audio message may be pushed over a Bluetooth network when the second party is using a Bluetooth configuration.

Parties who are generally monitoring the presence status of a particular party may determine when a presence status indication of a first party indicates that the first party is in an emergency situation. In one embodiment, an overall system may allow one party to effectively monitor the presence status of substantially all parties in an enterprise, e.g., employees of the enterprise, such that the party may determine when any party in the enterprise is in an emergency situation.

In one embodiment, a collaboration system may be configured to record a phone call when it is determined that a party has dialed an emergency phone number. That is, upon detecting that a party has dialed an emergency phone number, a collaboration system may substantially automatically record the phone call. Speech analysis techniques and the like may be applied to a recording of a call to an emergency phone number, and keywords may be identified for use in updating a presence status of a party. By way of example, if a party dials an emergency phone number such as 911 and mentions a need for an ambulance, a collaboration system may update a presence status of the party to indicate that the party is in an emergency and requires an ambulance.

When a call to an emergency phone number by a party is detected, and keywords used during the course of the call are identified using speech analysis, a presence status of the party may be updated based upon the keywords identified during the course of the call. For example, if the call to the emergency phone number by a party indicates that an attack may occur in a particular area at a particular time, the presence status of the party may be updated to warn that an attack may occur in a particular area at a particular time.

In addition to a presence status of a party being updated to indicate an emergency situation, a message which indicates that the party is in an emergency situation may be sent to an appropriate party or parties. For example, if a presence status of a first party indicates that the first party is in an emergency situation, a message such as a text message, a voice message, and/or an email message may be sent to a second party who is a known "emergency contact" of the first party. It should be appreciated that such a message is not limited to being sent to a known emergency contact of the first party. In one embodiment, such a message may be sent to multiple parties, e.g., such a message may be sent to substantially all parties identified in a contact list of the first party. Further, the presence status of a party in an emergency situation may also be substantially automatically pushed to a social networking site such that the status of the party within the social networking site identifies the emergency situation.

While a presence status indicator of a first party has been described as being updated to identify a second party that the first party is on a call with, it should be appreciated that a presence status indicator may be updated to identify more than one party that the first party is on a call with. For instance, if a first party is on a conference call that includes a second party and a third party, a presence status indicator of the first party may be arranged to identify the second party and the third party as being on the conference call with the first party.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   determining when a first party has initiated contact with a second party, wherein the first party initiates contact with the second party on a communications link;
   identifying identification information of the second party;
   updating a presence status indication of the first party to indicate that the first party has initiated contact with the second party, wherein the presence status indication of the first party includes information associated with the second party, and wherein the presence status indication includes at least one keyword identified using a speech analysis technique performed on communications between the first party and the second party;
   providing the presence status indication of the first party to a first application, the first application being arranged to monitor the presence status of the first party, wherein the first application is an instant messaging application; and
   presenting the presence status indication of the first party with respect to the first application.

2. The method of claim 1 wherein the contact is initiated using a telephone device, the telephone device being an Internet Protocol (IP) phone.

3. The method of claim 1 wherein the first application has a display associated with a third party, wherein the display presents an identifier for the first party and the presence status indication of the first party.

4. The method of claim 3 wherein the contact is initiated using a telephone device, the telephone device and the display are part of a collaboration system.

5. The method of claim 4 wherein the presence status indication of the first party is updated by a server arrangement, the server arrangement being part of the collaboration system.

6. The method of claim 1 wherein the second party is associated with emergency services, and wherein the identification information associated with the second party indicates that the second party is associated with the emergency services.

7. The method of claim 1 wherein the identification information associated with the second party is one selected from a group including a name of the second party, a telephone number of the second party, and a type of service provided by the second party.

8. The method of claim 1 further including:
   updating a presence status indication of the second party to indicate that the first party has initiated contact with the second party, wherein the presence status indication of the second party includes information associated with the first party.

9. A tangible, non-transitory computer-readable medium comprising computer program code, the computer program code, when executed, configured to:

determine when a first party has initiated contact with a second party, wherein the first party initiates contact with the second party on a communications link;

identify identification information of the second party;

update a presence status indication of the first party to indicate that the first party has initiated contact with the second party, wherein the presence status indication of the first party includes information associated with the second party, and wherein the presence status indication includes at least one keyword identified using a speech analysis technique performed on communications between the first party and the second party;

provide the presence status indication of the first party to a first application, the first application being arranged to monitor the presence status of the first party, wherein the first application is an instant messaging application; and present the presence status indication of the first party with respect to the first application.

10. The tangible, non-transitory computer-readable medium comprising computer program code of claim 9 wherein the contact is initiated using a telephone device, the telephone device being an Internet Protocol (IP) phone.

11. The tangible, non-transitory computer-readable medium comprising computer program code of claim 9 wherein the first application has a display associated with a third party, wherein the display presents an identifier for the first party and the presence status indication of the first party.

12. The tangible, non-transitory computer-readable medium comprising computer program code of claim 11 wherein the contact is initiated using a telephone device, the telephone device and the display are part of a collaboration system.

13. The tangible, non-transitory computer-readable medium comprising computer program code of claim 9 wherein the second party is associated with emergency services, and wherein the identification information associated with the second party indicates that the second party is associated with the emergency services.

14. The tangible, non-transitory computer-readable medium comprising computer program code of claim 9 wherein the identification information associated with the second party is one selected from a group including a name of the second party, a telephone number of the second party, and a type of service provided by the second party.

15. The tangible, non-transitory computer-readable medium comprising computer program code of claim 9 further comprising computer program code configured to update a presence status indication of the second party to indicate that the first party has initiated contact with the second party, wherein the presence status indication of the second party includes information associated with the first party.

16. An apparatus comprising:

a processor; and a logic arrangement, the logic arrangement being configured to cooperate with the processor to determine when a first party has initiated contact with a second party, the second party having an associated identity, the logic arrangement further being configured to cooperate with the processor to automatically update a presence status indicator of the first party to provide an indication of the associated identity when it is determined that the first party has initiated contact with the second party, the indication being provided in an instant messaging application, the presence status indicator being updated based on at least one keyword identified using a speech analysis technique performed on communications between the first party and the second party, wherein the logic arrangement is still further configured to cooperate with the processor to automatically provide the presence status indicator to at least a third party using the instant messaging application, wherein the first party is identified as a contact of the third party.

17. The apparatus of claim 16 wherein the associated identity is one selected from a group including a telephone number and a name.

18. The apparatus of claim 16 wherein the associated identity identifies an emergency service, and wherein the presence status indicator of the first party indicates that the first party is in an emergency situation.

19. The apparatus of claim 16 wherein the contact is initiated using a telephone device, the telephone device being an Internet Protocol (IP) phone, and wherein the logic arrangement is configured to determine when the first party has initiated contact with the second party by monitoring communications associated with the telephone device.

20. The apparatus of claim 16 wherein the logic arrangement is configured to provide the presence status indicator to the at least third party by providing the presence status indicator to the instant messaging application.

* * * * *